United States Patent [19]

Hanselka

[11] Patent Number: 4,927,999
[45] Date of Patent: May 22, 1990

[54] APPARATUS FOR FUSION JOINING PLASTIC PIPE

[75] Inventor: Reinhard Hanselka, Danville, Calif.

[73] Assignee: Georg Fischer AG, Switzerland

[21] Appl. No.: 384,284

[22] Filed: Jul. 21, 1989

Related U.S. Application Data

[60] Division of Ser. No. 245,929, Sep. 14, 1988, Pat. No. 4,876,041, which is a continuation of Ser. No. 919,238, Oct. 14, 1986, abandoned.

[51] Int. Cl.$^5$ .................. H05B 3/02; B29C 51/10
[52] U.S. Cl. .................. 219/535; 219/524; 156/156; 156/285
[58] Field of Search .............. 219/296, 522, 524, 526, 219/534, 544, 548; 156/156, 285, 272.2, 304.2, 379.6, 380.6, 381, 382

[56] References Cited

U.S. PATENT DOCUMENTS

| 1,865,669 | 7/1932 | Bostwick | 156/503 |
|---|---|---|---|
| 4,224,276 | 9/1980 | Gallizia | 264/571 |
| 4,449,038 | 5/1984 | Reich et al. | 156/304.2 |
| 4,450,038 | 5/1984 | Ishii et al. | 156/304.2 |
| 4,484,975 | 11/1984 | McElroy | 156/304.2 |
| 4,565,921 | 1/1986 | Piazzola | 219/535 |
| 4,876,041 | 10/1989 | Hanselka | 156/285 |

FOREIGN PATENT DOCUMENTS

| 50-9017 | 4/1975 | Japan . |
| 55-139217 | 10/1980 | Japan . |
| 55-142617 | 11/1980 | Japan . |
| 58-29617 | 2/1983 | Japan . |

Primary Examiner—Bruce A. Reynolds
Assistant Examiner—Leon K. Fuller
Attorney, Agent, or Firm—Roberts and Quiogue

[57] ABSTRACT

Apparatus for fusion joining first and second axially abutted thermo-plastic piping system component connection ends that are in axial and circumferential alignment including apparatus for enabling the heating of a melt region in the proximity of the interface of the first and second piping system component connection ends at least to the material softening point of the thermoplastic material of the melt region, and further including vacuummetric apparatus for vacuummetrically inducing outward translation of the melted material of the melt region.

16 Claims, 4 Drawing Sheets

APPARATUS FOR FUSION JOINING PLASTIC PIPE

This is a division of copending U.S. application Ser. No. 07/245,929, filed Sept. 14, 1988 now U.S. Pat. No. 4,876,041 which was a continuation of U.S. application Ser. No. 06/919,238, filed Oct. 14, 1986, abandoned.

BACKGROUND OF THE INVENTION

The disclosed invention generally relates to the joining of plastic piping system component connection ends, and is more particularly directed to apparatus for fusion joining plastic piping system component connection ends for use in high purity applications where internal voids, crevices, cavities, or the like cannot be tolerated.

Plastic piping system components made from a variety of thermo-plastic materials are utilized in a wide range of applications as a result of the useful characteristics of thermo-plastic materials, which include resistance to corrosion, imperviousness to contamination, reduced cost, ease of installation, and lighter weight.

Known methods of joining plastic piping system components include the use of mechanical means, solvent cement, and/or heat fusion.

Examples of mechanical means include threaded couplings, compression fittings, and flanged fittings. An example of solvent cement joining would be the application of cement to a pipe end which is then inserted into a fitting or valve. An example of heat fusion is a butt joint between piping system component ends. Such butt joints tend to be weak, and various couplings have been devised for joining piping system components through the application of heat. A further example of heat fusion is socket fusion where heated piping system component ends are inserted into a coupling.

In high purity applications, such as the semiconductor industry, the food industry, the pharmaceutical industry, the biotechnical industry, and chemical manufacture, it is important that contamination be avoided. Mechanical joining techniques have been utilized in high purity applications, but require frequent disassembly for cleaning since the mechanical joining components have crevices and voids where contamination can be readily lodged.

The use of solvent cement presents a contamination problem since internal voids, crevices, or cavities are readily formed. Contamination or potentially contaminating material could readily be lodged in such voids, crevices, or cavities.

The use of known heat fusion joining techniques in high purity applications also present a contamination problem in that unwanted voids, crevices, or cavities are readily formed. Contamination or potentially contaminating material could become lodged in such voids, crevices, or cavities. As a result, attempts have been made to provide for heat fusion joints which are smooth and free of voids, crevices and cavities on the inside. Such attempts have included the use of some form of inside support apparatus to support the piping system component connection ends when they are subjected to heat in the fusion process. For example, expandable mandrels which are inserted and then expanded to the inside diameter have been utilized. An important consideration with the use of internal support apparatus is the planning required to make sure that the support apparatus could be removed after the piping system components are joined. For example, if the piping system components being joined include right angle joints that have already been formed, removal could pose a problem. Also, the fact that support apparatus is inside the piping system components being joined poses the potential for contamination.

Another consideration with known heat fusion techniques is that they cannot be used with readily oxidized thermo-plastic materials such as polyvinyl chloride (PVC).

SUMMARY OF THE INVENTION

It would therefore be an advantage to provide a high purity plastic piping system component fusion joining technique which does not utilize couplings.

It would also be an advantage to provide a high purity plastic piping system component fusion joining technique which does not utilize support apparatus that is within the components being joined.

Another advantage would be to provide for a high purity plastic piping system component fusion joining technique which can be reliably utilized on site at the location of installation.

Still another advantage would be to provide for a high purity plastic piping system component fusion joining technique that provides for a joint that is internally smooth and free of contamination lodging voids and crevices.

Still another advantage would be to provide for a high purity plastic piping system component fusion joining technique which provides for the uncontaminated heat fusion of piping system component connection ends.

Still another advantage would be to provide a high purity plastic piping system component joining technique which may be used with readily oxidized thermoplastic materials.

The foregoing and other advantages and features of the invention are provided in an apparatus for fusion joining first and second axially abutted piping system component connection ends that are in axial and circumferential alignment, and which includes apparatus for enabling the heating of a melt region in the proximity of the interface of the first and second piping system component connection ends at least to the material softening point of the thermo-plastic material of the melt region. The fusion joining apparatus further includes vacuummetric apparatus for vacuummetrically inducing outward translation of the melted material of the melt region.

BRIEF DESCRIPTION OF THE DRAWING

The advantages and features of the disclosed invention will readily be appreciated by persons skilled in the art from the following detailed description when read in conjunction with the drawing wherein:

FIG. 1 is a schematic perspective view of one embodiment of a heat and vacuum applying clamp of the invention.

FIG. 2 is a longitudinal cross-sectional view of the heat and vacuum applying clamp of FIG. 1 in position about piping system component connection ends to be joined.

FIG. 3A is a lateral cross-sectional view of the heat and vacuum applying clamp of FIG. 1.

FIG. is a fragmentary lateral cross-sectional view of a further vacuum distributing structure for the heat and vacuum applying clamp of FIG. 1.

FIG. 4 is a schematic perspective view of a split vacuum applying clamp of a further embodiment of the invention.

FIG. 5 is an elevational view the inside face of one side of the split vacuum applying clamp of FIG. 4.

DETAILED DESCRIPTION OF THE DISCLOSURE

In the following detailed description and in the several figures of the drawing, like elements are identified with like reference numerals.

I. Overview

The disclosed invention relates to the joining of thermo-plastic piping system component connections ends (e.g., pipe ends, fitting ends, and valve ends). The thermo-plastic materials from which such piping system component connection ends may be made include polypropylene, polyethylene, polybutylene, polyvinylidene fluoride (PVDF), perfluoroalkoxy (PFA), ethylene-chlorotrifluoroethylene (ECTFE), polyvinyl chloride (PVC), acrylonitrile butadiene styrene (ABS), or blends. Such thermo-plastic materials exhibit thermal expansion when heated, and will melt and flow at respective temperatures known as material softening points, which depend on the specific material.

Further, the disclosed invention relates to the joining of thermo-plastic piping system connection ends by inter alia abutting the terminal edges of the connection ends in axial and circumferential alignment, and heating and melting the terminal portions of the ends. For ease of reference, the abutment of the terminal edges of the piping system connection ends is called the interface, and the terminal regions of the ends to be melted are collectively referred to as the melt region. Further, the axially and circumferentially aligned abutment of the piping system connection ends shall also be referred to as axial abutment.

The invention generally includes apparatus having means for enabling the heating of the melt region of the axially abutted piping system component connection ends and means for effecting the vacuummetric outward translation of the melted thermo-plastic material. In the cross-sectional view of FIG. 2, for example, the fusion-jointure of the two axially abutted thermo-plastic piping system component connection ends 75, 77 may be effected through the use of an apparatus which includes a heating element 51 for enabling the heating of the melt region, and which cooperates with the gaskets 67, 69 and the melt region to define the vacuum chamber 79.

With regard to the heating enablement aspects of the invention, the heating element 51 is more specifically embodied as a thermal transfer means which communicates externally applied material-softening thermal energy to the melt region at the interface of the piping system component connection ends 75, 77. In the illustrated embodiment of FIGS. 1 through 3B, the heating element 51 is still more specifically embodied in a thermally conductive form configured for thermal transmissivity to the melt region. The applied thermal energy may comprise heat which is thermally conductively coupled to the thermally conductive heating element 51. The heating element 51 is further shown as being displaced from the melt region such that the heating element 51 heats the melt region with radiant heat.

Figures 1, 2, 3A, 3B, 4, 5:
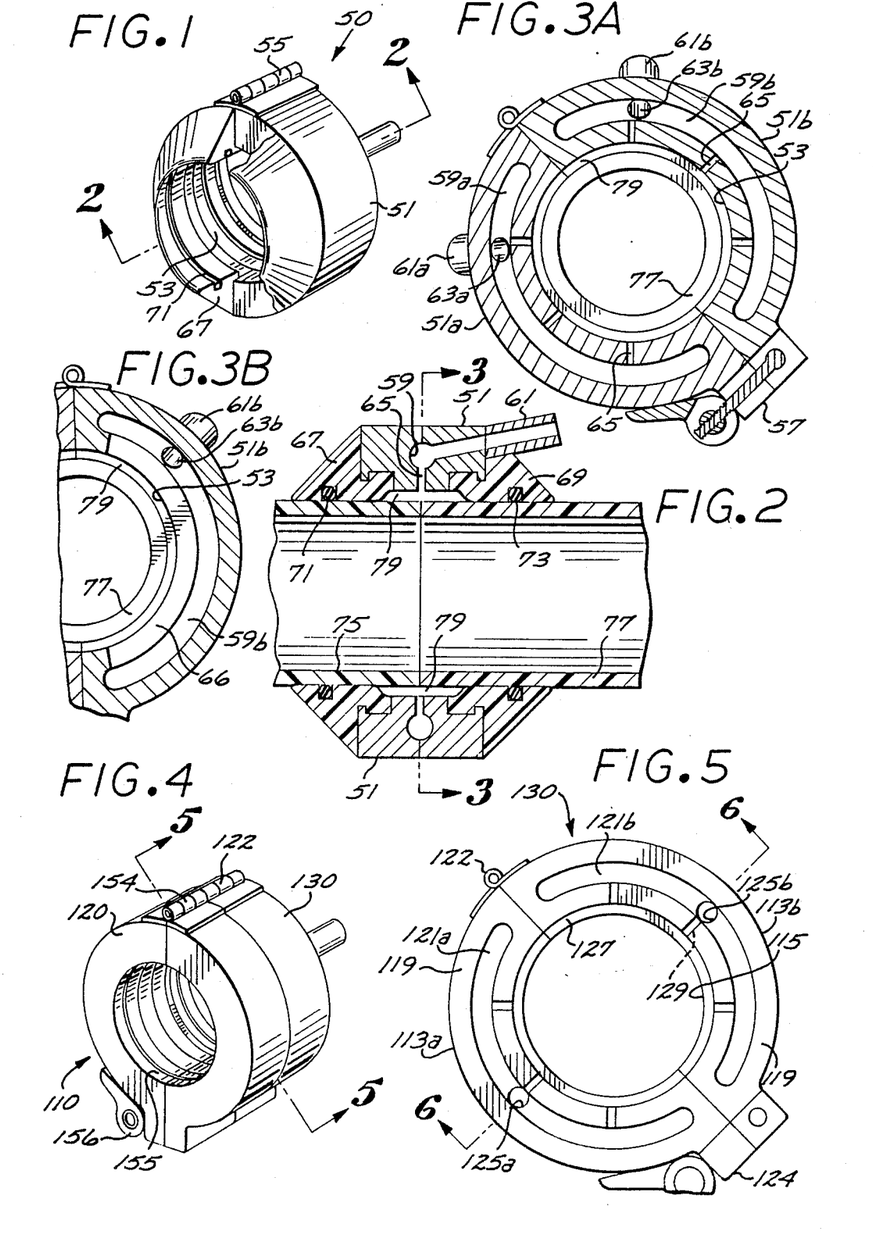

While a suitable external heat source would be employed with the embodiment of FIG. 1, the invention also contemplates a thermal source which may be thermally integral with a given thermally conductive element. The alternative device of FIG. 10 thus includes a heat source 245 which appears in cross-section in the lower portion of FIG. 11.

Figures 12, 13:
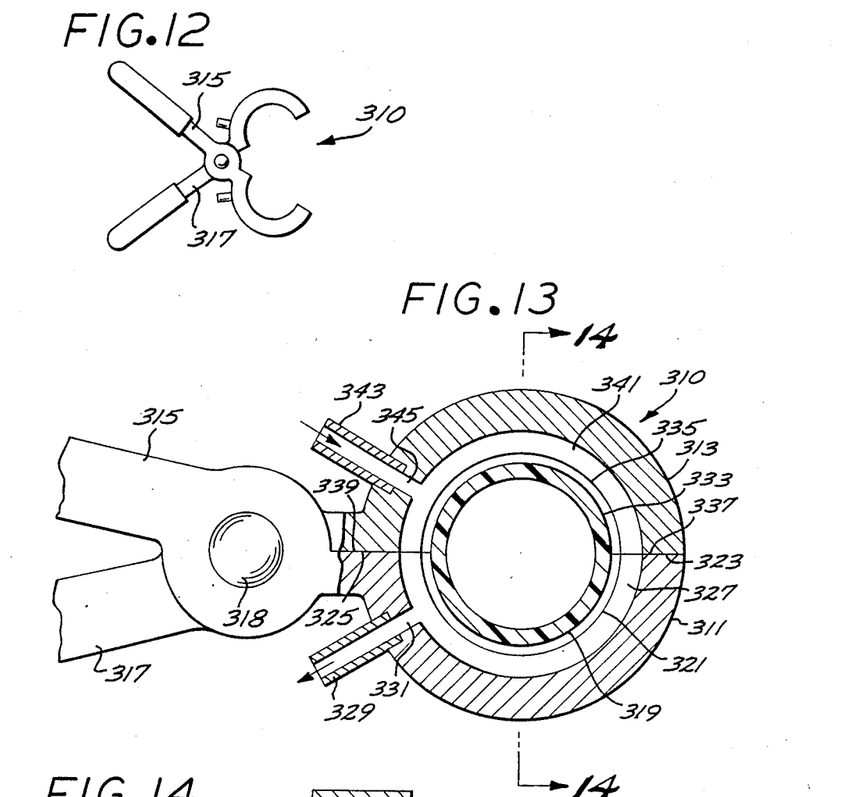
FIG. 12 is a schematic perspective view of a heat and vacuum applying clamp of the invention which utilizes hot air to apply heat to the piping system component connection ends to be joined.
FIG. 13 is lateral cross-sectional view of the heat and vacuum applying clamp of FIG. 12.
Figure 14:
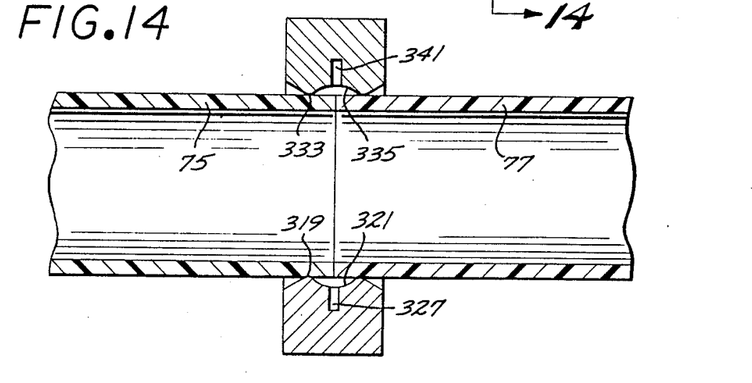
FIG. 14 is a longitudinal cross-sectional view of the heat and vacuum applying clamp of FIG. 12 in position about the piping system component connection ends to be joined.

The further alternative apparatus of FIGS. 12 through 14 also employs a thermal transfer means, but which includes fluid channelling means 343, 341 and 329 which are configured for fluidic communicability with the melt region of the axially abutted piping system component connection ends. The externally applied thermal energy may comprise material softening hot fluid (e.g., air, silicone, glycerine) forced into the fluid channelling means.

Another heating alternative involves the physically direct application of heat to the melt region by an external source that is brought into direct contact with the melt region. After the melt region is melted, an appropriately configured and selectively positionable vacuum apparatus is moved into position over the melted melt region. A hinged, quick-locking device along the lines of the apparatus of FIGS. 1 through 3 may accordingly be maintained in a position away from the melt region while heating of the melt region is independently effected and then quickly locked into position about the melted melt region for vacuummetric suction.

Preferable in this regard, however, is a vacuum application structure of the type shown in FIGS. 4 through 7 which circumferentially encompasses the axially abutted piping system components ends. The vacuum application structure of FIGS. 4 through 7 is transversely sectioned for longitudinal separability. The cross-sectional view of FIG. 6 thus shows the vacuum application structure in its longitudinally separated disposition with an interposed heating mandrel 111 in contact with the melt region, while the complementary longitudinally joined vacuummetric disposition about the melt region is shown in the cross-sectional view of FIG. 7.

With regard now to the vacuummmetric aspects of the invention, the supporting gaskets 67, 69 and the inside wall of the bore 53 of FIG. 2 circumferentially encompass the axially abutted piping system component connection ends and cooperate with the outer surface of the melt region to form a vacuum chamber that surrounds the melt region. The vacuum chamber is in fluidic communication with structure for distributing vacuum about the vacuum chamber.

The illustrated embodiments exemplify two different realizations for the structure for distributing vacuum. In FIG. 3A, for example, the vacuum distribution structure includes a discrete plurality of mutually separated holes 65 respectively emanating from an interior wall of the vacuum chamber. The general vacuummetric applying structure may then include a vacuum application inlet such as the inlet 61, while the vacuum distributing structure may further include a vacuum distribution header 59 that is fluid-communicatively interposed between the inlet and the channels.

The device of FIG. 3B and the device of FIGS. 12 through 15 employs the second exemplified type of vacuum distributing structure. This includes a continuous slot emanating from an interior wall of the vacuum chamber.

Figure 8:
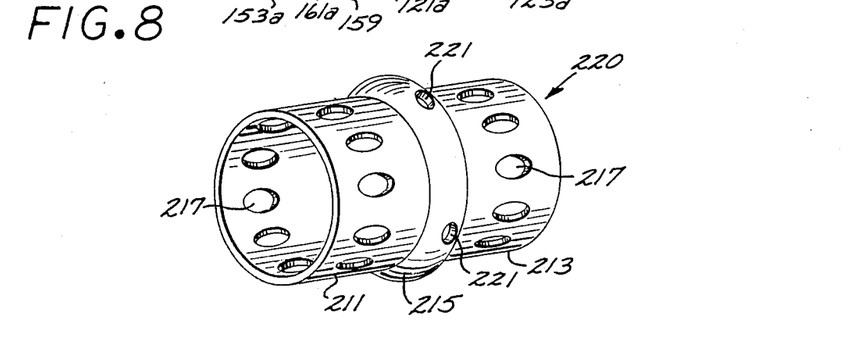
FIG. 8 is a schematic perspective view of a mating sleeve which is utilized in another embodiment of the invention.
Figure 9:
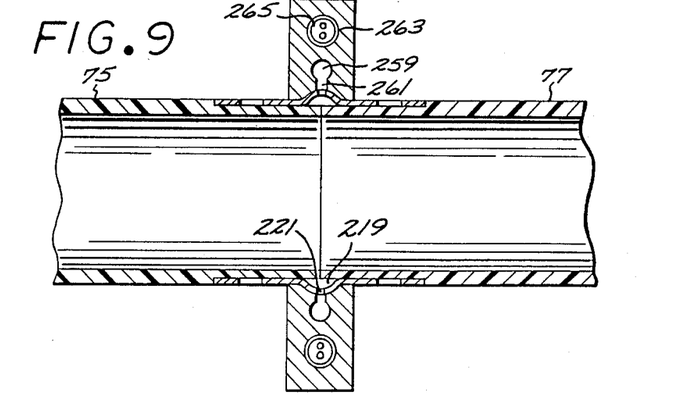
FIG. 9 is a longitudinal cross-sectional view of the mating sleeve of FIG. 8 in position about the piping system component connection ends to be joined.
Figure 10:
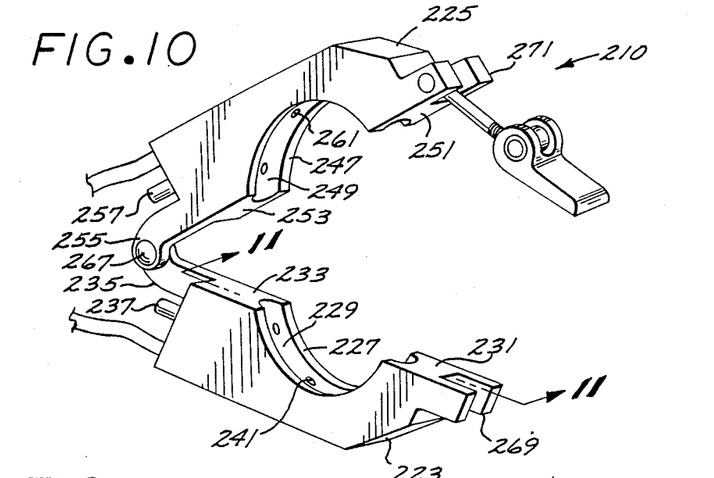
FIG. 10 is a schematic perspective view of a heat and vacuum applying clamp which is utilized with the mating sleeve of FIG. 8.
Figure 11:
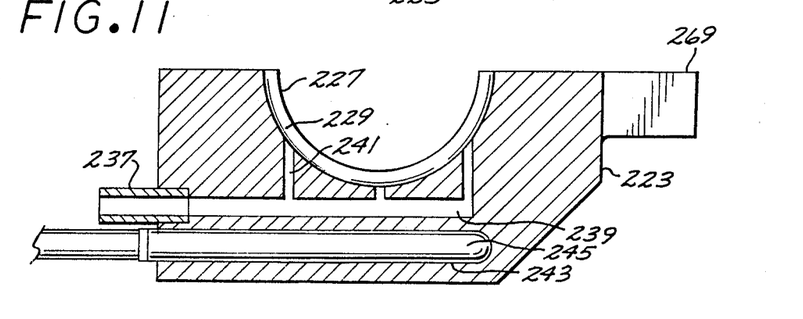
FIG. 11 is a partial cross-sectional view of the heat and vacuum applying clamp of FIG. 10.

The heat and vacuum applying apparatus of FIGS. 9 through 11 cooperate with the cylindrical mating sleeve of FIG. 8 which is configured for circumferentially fitting around the axially abutted piping system component connection ends. The cylindrical mating sleeve includes a longitudinally arced central portion for defining a vacuum chamber adjacent the melt region of the axially abutted piping system component connection ends. The longitudinally arced central portion communicates applied material softening heat to the melt region of the axially abutted piping system component connection ends. The heating enablement means for use with the sleeve includes means for communicating applied material-softening thermal energy to the thermally conductive sleeve.

It should be apparent that an overall apparatus according to the present invention is configured for a circumferential encompassability of the subject cylindrical abutment-region. The illustrated devices are more specifically shown to conveniently be longitudinally sectioned into cooperating transversely separable sections respectively having semicircular openings. In addition, the separable sections, for example of FIGS. 3 and 5, include diametrically disposed hinge and locking mechanisms for providing quick release pivotability of the transversely separable sections. In the apparatus of FIG. 12 through 14, the hinged sections further include opposing handle members configured for the manually leveraged oppositional pivotability of the transversely separable sections. It may likewise be noted that for piping system component connections ends of a given predetermined cylindrical diameter, a subject apparatus in accordance with the invention is advantageously configured on an overall size scale comparable to the diameter of the piping system component connection ends and which allows for manual operation of the fusion joining apparatus.

II. Embodiment Details

Referring now to FIGS. 1 through 3, shown therein is a heat and vacuum applying clamp 50 which includes an annular heating element 51 having a cylindrical central bore 53. The annular heating element 51 is longitudinally sectioned for transverse or lateral separability, and includes two semi-annular heating element halves 51a, 51b. By way of example, the heating element 51 may be made of a heat conductive material such as aluminum and may be heated with one of a number of commercially available heater bands or heater elements (not shown) which would be in thermally conductive contact with the heating element 51.

A hinge 55 is secured to both heating element halves 51a, 51b and allows the heating element 51 to be pivotally opened and closed. The heating element halves 51a, 51b may be secured in a closed position by a locking mechanism 57, which is schematically shown as a quick-release cammed toggle bolt.

The semi-annular heating element halves 51a, 51b respectively include internal circularly curved vacuum distributing headers 59a, 59b. The vacuum distributing header 59a is in communication with a vacuum inlet 61a via a bore 63a. The vacuum distributing header 59b is in communication with a vacuum inlet 61b via a bore 63b. The vacuum inlets 61a, 61b emerge from the outside planar faces of the heating element halves 51a, 51b to allow a heater band (not shown) to circularly surround the heating element 51. As will be discussed further herein, the vacuum inlets 61a, 61b are intended to be coupled to a vacuum source (not shown). The circularly curved vacuum distributing headers 59a, 59b are further in communication with the central bore 53 via a plurality of small openings 65.

The circularly curved vacuum distributing headers 59a, 59b may be made as follows. Each of the semi-annular heating element halves 51a, 51b is transversely split into two sides along a plane that is orthogonal to the longitudinal axis of the heating element bore 53. The inside faces of the split sides are respectively machined to form circularly curved channels that are mirror images of each other. The split sides are then secured to each other by appropriate clamping or bolting apparatus (not shown) or with a high temperature adhesive.

It should be noted that in each of the heating element halves 51a, 51b, the small holes 65 may be replaced with respective narrow, partially annular slots that radially extend between the circularly curved vacuum distributing headers 59a, 59b and the bore 53. FIG. 3B schematically illustrates, for the element half 51b, a narrow, partially annular slot 66 which radially extends between the circularly curved vacuum distributing header 59b and the bore 53. By appropriate machining, such narrow, partially annular slots for each of the element halves 51a, 51b may be machined when the components of the heating element 51 are machined to form the circularly curved vacuum distributing headers 59a, 59b.

The heat and vacuum applying clamp 50 further includes an annular supporting gasket 67 which is secured to one side of the heating element 51. Another annular supporting gasket 69 is secured to the other side of the heating element 51. By way of example, a circular tongue and groove arrangement, as shown, may be utilized in securing the supporting gaskets 67, 69 to the heating element 51.

The inside perimeters of the annular supporting gaskets 67, 69 form cylindrical bores of substantially the same size and are coaxial with the bore 53. The cylindrical bores of the annular supporting gaskets 67, 69 include respective annular grooves for accepting O-rings 71, 73. The inside edges of the gaskets 67, 69 are radiused to provide a smooth transition from the cylindrical bore of such gaskets 67, 69. The supporting gaskets 67, 69 and the O-rings 71, 73 are longitudinally split in alignment with the halves 51a, 51b of the heating element 51.

The supporting gaskets 67, 69 are made of a heat resistant material such as reinforced polytetrafluoroethylene (PTFE) or other material which would not require further sealing. The O-rings 71, 73 are made of a heat resistant material such as silicone rubber.

The heating element 51, the supporting gaskets 67, 69, and the O-rings 71, 73 form the heat and vacuum applying clamp 50 which may be hingeably opened so that it can be secured around the terminal portions of the piping system component connection ends to be joined.

It should be noted that to the extent a hinged heater band may be capable of maintaining the semi-annular heating element halves 51a, 51b securely about the piping system component connection ends to be joined, the heater element halves may be secured to such hinged heater band which would provide the mechanism for hinging and locking. Also, non-hinged heater sections may be separately secured to the semi-annular heater element halves 51a, 51b.

The operation of the heat and vacuum applying clamp 50 is more particularly described with reference to FIG. 2. The piping system connection ends 75, 77 are secured by an appropriate alignment fixture (not shown) or a pipe rack (also not shown) so that such ends 75, 77 are in axial and circumferential alignment with their terminal edges butted against each other to form an interface. The heat and vacuum applying clamp 50 is then secured about the terminal portions of piping system connections ends 75, 77.

When the heat and vacuum applying clamp 50 is secured to the piping system component connection ends 75, 77, a vacuum chamber 79 is formed. Such vacuum chamber is particularly defined by the outside surfaces of the piping system component connection ends that are between the O-rings 71, 73, the inside surface of the bore 53, the longitudinal interior surfaces of the support gaskets 67, 69, and the O-rings 71, 73. It is important that a good seal be provided so as to allow for the creation of a vacuum in the vacuum chamber 79.

The terminal portions of the piping system connection ends 75, 77 adjacent the vacuum chamber 79 form a melt region which is heated by the radiant heat provided by the heating element 51. The provided radiant heat is concentrated within the vacuum chamber 79 as a result of the support gaskets 67, 69, and the O-rings 71, 73. As the melt region is heated, the thermo-plastic material melts, expands, and flows. As a result of the induced expansion, the resultant flow is both longitudinal as well as lateral.

After sufficient time for the thermo-plastic material of the melt region adjacent the vacuum chamber 79 to reach a temperature above the material softening point, a vacuum is applied to the vacuum inlets 61a, 61b, and the heating of the heating element 51 is terminated. The melted and expanded thermo-plastic material of the melt region is drawn into the vacuum chamber 79 by the applied vacuum. The application of vacuum compensates the inward lateral flow of the thermally expanding melted thermoplastic material, and is applied only for a short period of time such as a few seconds. The heated thermo-plastic material is allowed to cool so that it congeals to form a solid fused joint. The heat and vacuum applying clamp 50 may be removed after the heated thermo-plastic material has cooled to a temperature below its material softening point.

Referring now to FIGS. 4 through 7, shown therein is a further embodiment of the joining apparatus of the invention which includes a moveable heating mandrel 111 and a split vacuum applying clamp 110 which is transversely sectioned. The heating mandrel 111 is movable so that it can be selectively placed against the melt region of the piping system component connection ends to be joined and subsequently moved away from the piping system component connection ends to allow the sections of the split vacuum applying clamp 110 to be brought together to apply a vacuum to the melted thermo-plastic pipe material.

The vacuum applying clamp 110 is transversely sectioned and includes essentially functionally symmetrical left and right annular clamp elements 120, 130. The right annular clamp element 130 is longitudinally sectioned and includes semi-annular halves 113a, 113b. The inside surface of the right annular clamp element 130 forms a cylindrical bore 115, and an annular groove is formed in the bore 115 for accepting a heat resistant O-ring 117 which is split in alignment with the semi-annular element halves 113a, 113b. The right annular clamp element 130 further includes a joining face 119 which is intended to be placed against a corresponding joining face of the left annular clamp element 120 of the vacuum applying clamp 110.

A hinge 122 is secured to both semi-annular halves 113a, 113b and allows the semi-annular halves to be opened and closed. The semi-annular halves 113a, 113b may be secured in a closed position by a locking mechanism 124, which is schematically shown as a quick release cammed toggle bolt.

Figure 7:
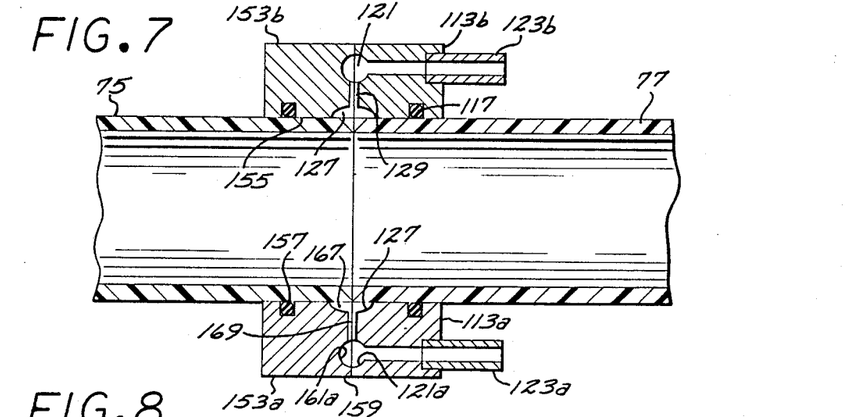
FIG. 7 is a longitudinal cross-sectional view of the vacuum applying clamp of FIG. 4 in a longitudinally joined or closed position for applying vacuum about the piping system component connection ends.

A circularly curved channel 121a is formed in the portion of the joining face 119 on the semi-annular half 113a, with a circularly curved channel 121b being formed in the portion of the joining face on the semi-annular half 113b. As illustrated in FIG. 7, the curved channels 121a, 121b respectively cooperate with corresponding curved channels in the left annular clamp element 120 to form curved vacuum distribution headers.

A vacuum inlet 123a extends from the semi-annular half 113a and is in communication with the curved channel 121a via a bore 125a. A vacuum inlet 123b extends from the semi-annular half 113b and is in communication with the curved channel 121b via a bore 125b.

Figure 6:
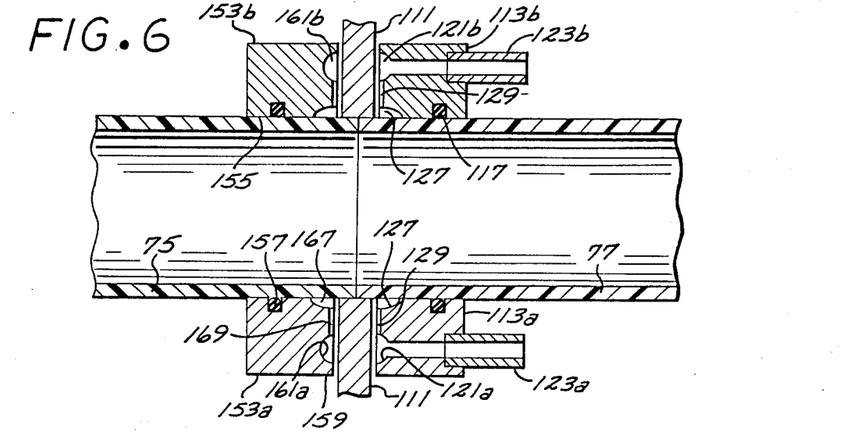
FIG. 6 is a longitudinal cross-section of the split vacuum applying clamp of FIG. 4 in a longitudinally separated position about piping system component connection ends to be joined for allowing heating of the piping system component connection ends.

The region between the inside surface of the bore 115 and the joining face 119 is inwardly rounded to provide a rounded recess 127. A plurality of grooves 129 run between the curved channels 121a, 121b and the rounded recess 127.

The left annular clamp element 120 is almost a mirror image of the right annular clamp element 130, except without the vacuum inlets and communicating bores. Specifically, the left annular clamp element 120 is transversely sectioned and includes semi-annular halves 153a, 153b. The inside surface of the left annular element 120 forms a cylindrical bore 155, and an annular groove is formed in the bore 155 for accepting a heat resistant O-ring 157 which is split in alignment with the semi-annular element halves 153a, 153b. The left annular clamp element 120 further includes a joining face 159 which is intended to be adjacent the corresponding joining face 119 of the right annular clamp element 130 of the vacuum applying clamp 110.

A hinge 154 is secured to both semi-annular halves 153a, 153b and allows the semi-annular halves to be opened and closed. A locking mechanism 156 which may be substantially similar to the quick release cammed toggle bolt 124 may secure the semi-annular halves 153a, 153b in a closed position.

A circularly curved channel 161a is formed in the portion of the joining face 159 on the semi-annular element half 153a of the left annular clamp element 120; and a circularly curved channel 161b is formed in the portion of the joining face 159 on the semi-annular element half 153b. As illustrated, the curved channels 161a, 161b respectively cooperate with the corresponding curved channels 121a, 121b in the right annular clamp element 130 to form curved vacuum distribution headers.

Further as to the left annular element 120 of the vacuum applying clamp 110, the region between the inside surface of the bore 155 and the joining face 159 is inwardly rounded to provide a rounded recess 167. A plurality of grooves 169 run between the curved channels 161a, 161b and the rounded recess 167. The grooves 169 are preferably in alignment with corresponding grooves 129 in the right annular element 130.

By way of example, the left and right annular clamp elements 120, 130 may be made of machined aluminum, stainless steel, or the like. The O-rings 117, 157 may be made of a heat resistant material such as silicone rubber. It is important that such O-rings provide a good seal for the application of vacuum when the left and right annular clamp elements 120, 130 are clamped around the piping system component connection ends to be joined and against each other.

In operation, the piping system component connection ends 75, 77 to be joined are passed through the cylindrical bores of annular clamp elements 120, 130 of the vacuum applying clamp 110, and are then secured by an appropriate fixture (not shown) or pipe rack (also not shown) so that the piping system component connection ends 75, 77 are in axial and circumferential alignment with their terminal edges butted against each other to form an interface.

The left and right annular clamp elements 120, 130 of the vacuum applying clamp 110 are longitudinally separated to allow the placement of the heating mandrel 111 in direct contact with the melt region of the piping system component connection ends 75, 77, as shown in FIG. 6. Heat is applied for a sufficient amount of time to allow the melt region of the piping system component connection ends to reach an appropriate temperature above the material softening point of the thermo-plastic material. The heating mandrel 111 is then removed and the left and right annular elements 120, 130 of the vacuum applying apparatus 110 are brought together so that an annular vacuum chamber is formed by the rounded recesses 127, 167 adjacent the melted portion of the piping system component connection ends 75, 77. Vacuum is applied to the vacuum inlets 123a, 123b so that the melted and expanded thermo-plastic material is drawn into the vacuum chamber. By way of example, the vacuum is applied for about a few seconds. The heated thermo-plastic material is allowed to cool so that it congeals to form a solid fused joint. The vacuum applying clamp 110 may be removed after the heated thermo-plastic material has cooled to a temperature below its material softening point.

Referring now to FIGS. 8 through 11, another embodiment of the invention includes a heat and vacuum applying clamp 210 which cooperates with a permanently installed cylindrical mating sleeve 220 to provide for the vacuum fusion joining of piping system component connection ends in accordance with the invention.

The mating sleeve 220 includes first and second sleeve bands 211, 213 which are separated by a raised longitudinally arced central band 215. The sleeve bands 211, 213 have cylindrical inside surfaces of the same inside diameter. Each of the sleeve bands 211, 213 may further include a plurality of apertures 217 distributed about them. The longitudinally arced central band 215 includes a curved inside surface that forms an annular recess 219, and further includes a plurality of small apertures 221 distributed about the central band 215 and which are in communication with the annular recess 219 on the inside of the central band 215.

By way of example, the first and second sleeve bands 211, 213 are thin walled and made of a corrosion resistant metal such as stainless steel. The inside diameters of the first and second sleeve bands are made to a very close tolerance. The longitudinally arced central band 215 should also be made of a corrosion resistant metal, and may be integrally formed with the first and second sleeves 211, 213 from a single piece of thin walled sheet metal.

Referring now to FIG. 10, the heat and vacuum applying clamp 210 includes a first jaw 223, and a second jaw 225. The first jaw 223 includes a semicircular opening 227 having a rounded semi-annular channel 229 formed therein. The distal ends of the opening 227 and the semi-annular rounded channel 229 intersect with front and rear faces 231, 233 which are radial to the semicircular opening 227. A short lever 235 extends rearwardly from the first jaw 223.

Referring now to FIG. 11, the first jaw 223 further includes a vacuum inlet 237 which extends into an elongated vacuum distribution header 239. The vacuum distribution header 239 is in communication with the semiannular channel 229 via a plurality of bores 241. An elongated bore 243 may be provided for accepting a heating element 245.

The second jaw 225 is similar to the first jaw 223 and includes a semicircular opening 247 having a rounded semi-annular channel 249 formed therein. The distal ends of the opening 247 and the semi-annular rounded channel 249 intersect with front and rear faces 251, 253 which are radial to the semicircular opening 247. A short lever 255 extends rearwardly from the second jaw 225.

With reference to FIGS. 9 and 10, the second jaw 225 further includes a vacuum inlet 257 which extends into an elongated vacuum distribution header 259. The vacuum distribution header 259 is in communication with the semi-annular channel 249 via a plurality of bores 261. An elongated bore 263 is provided for accepting a heating element 265.

The vacuum inlets 237, 257 of the first and second jaws 223, 225 are intended to be coupled to a vacuum source (not shown).

The first and second jaws 223, 225 are pivotally linked with a pin 267 which is secured in the respective short levers 235, 255 of the first and second jaws 223, 225. A locking mechanism may be provided for securing the first and second jaws 223, 225 in the closed position and is illustrated as a quick release cammed toggle bolt assembly. A slotted catch 269 is on the first jaw 223 adjacent its front face 231, and a toggle bolt assembly 271 is on the second jaw 225 adjacent its front face 251.

When the first and second jaws 223, 225 are in the closed position, the semi-circular openings 227, 247 form circular edges on either side of a rounded annular channel formed by the rounded semi-annular channels 229, 249.

The first and second jaws 223, 225 are readily made of machined metal stock, such as aluminum or stainless steel.

The foregoing mating sleeve 220 and the heat and vacuum applying clamp 210 are utilized as follows. The terminal portions of the piping system component connection ends 75, 77 to be joined may be peeled and square cut to uniformly size the circumferences of the piping system component connection ends for use with the mating sleeve 220. The square cut assures that the longitudinal axes of the ends coincide when their terminal edges are butted against each other. A peeling tool for providing a peeled circumference and a square cut may be of a type which is readily available.

After the piping system component connection ends are peeled and square cut, the peeled portion of one connection end is inserted into the sleeve band 211 and the peeled portion of the other connection end is inserted into the sleeve band 213. The piping system component connection ends are inserted so that the terminal edges are butted against each other adjacent the annular recess 219 on the inside of the longitudinally arced central band 215. By way of example, the peeled portions of the piping system component connection ends may of sufficient length so that the distal ends of the sleeve bands 211, 213 are very close to the ends of the peeled portions when the piping system component connection ends are inserted and butted against each other.

While the sleeve 220 provides for some axial and circumferential alignment of the piping system component connection ends to be joined, an alignment fixture (not shown) or a pipe rack (also not shown) may be utilized to ensure that the alignment is preserved when the heat and vacuum applying clamp 210 is utilized.

The jaws 223, 225 of the heat and vacuum applying clamp 210 are heated (or may have been heated while the piping system component connection ends were being prepared) to a predetermined temperature and secured about the longitudinally arced central band 215 of the sleeve 220. The central band 215 conducts heat to the thermoplastic pipe material melt region adjacent the annular recess 219 which is heated to a temperature higher than its material softening point. The thin walls of the sleeve bands 211, 213 and the apertures 217 cooperate to reduce the heat applied to the piping system component connection ends adjacent such sleeve bands 211, 213.

After the melt region has melted and expanded, heating is terminated (i.e., the heating elements 245, 265 are turned off), and vacuum is applied to the vacuum inlets 237, 257. The edges of the openings 227, 247 form a seal with the sides of the central band 215 of the sleeve 220, and vacuum is transmitted via the centrally located small apertures 221 of the central band 215. The melted thermo-plastic material is thereby drawn into the annular recess 219 of the central band 215 of the sleeve 220. By way of example, the vacuum is applied for a few seconds. The heated thermo-plastic material is allowed to cool so that it congeals to form a solid fused joint. The heat and vacuum applying clamp 210 may be removed after the heated thermo-plastic material has cooled to a temperature below its material softening point.

The use of the permanently installed cylindrical mating sleeve 220 provides for increased strength of the fused joint between the piping system component connection ends.

Referring now to FIGS. 12 through 14, illustrated therein is an embodiment of the invention which utilizes hot air to provide convective heating of the piping system component connection ends to be joined. A heat and vacuum applying clamp 310 is provided which includes pivoted jaws 311 and 313. The first jaw 311 is coupled to a first elongated lever 315 and the second jaw 313 is coupled to a second elongated lever 317. The first and second jaws 311, 313 are pivotally coupled by a boss 318 that is secured in the levers 315, 317 near the jaws 311, 313. The first and second jaws 311, 313 are opened and closed, respectively, by displacing the levers 315, 317 away from each other and toward each other.

The first jaw 311 includes a semi-circular opening 319 having a rounded semi-annular channel 321 formed therein. The distal ends of the opening 319 and the semi-annular rounded channel 321 intersect with front and rear faces 323, 325 which are radial to the semicircular opening 319. The first jaw 311 further includes a semi-circular radial slot 327 in communication with the semi-annular rounded channel 321. The radial slot 327 is in communication with an outlet 329 via a bore 331.

The second jaw 313 is similar to the first jaw 311 and includes a semicircular opening 333 having a rounded semi-annular channel 335 formed therein. The distal ends of the opening 333 and the semi-annular rounded channel 335 intersect with front and rear faces 337, 339 which are radial to the semicircular opening 333. The second jaw 313 further includes a semi-circular radial slot 341 in communication with the semi-annular rounded channel 335. The radial slot 341 is in communication with an inlet 343 via a bore 345.

When the first and second jaws 311, 313 are in the closed position, the semi-circular openings 319, 333 form circular edges on either side of a rounded annular channel formed by the rounded semi-annular channels 321, 335. The radial slots 327, 341 form a continuous annular radial slot.

The first and second jaws 311, 313 are readily made of metal or other material, such as aluminum, stainless steel, or reinforced plastic. The levers 315, 317 may be integrally formed with the respective first and second jaws 311, 313.

In use, forced hot air, forced cool air, or vacuum may be applied to the inlet 343. When forced hot air or forced cool air is applied to the inlet 343, the outlet 329 is controlled (e.g., by a valve) to allow the outward flow of air. When a vacuum is applied to the inlet 343, the outlet 329 is controlled so that air is substantially prevented from flowing inward. By way of example, the flow of air into and out of the outlet 329 may be controlled by a check valve or some other form of valve coupled to the outlet.

The operation of the heat and vacuum applying clamp 310 will be discussed relative to FIGS. 13 and 14. The piping system component connection ends 75, 77 are secured by an appropriate alignment fixture (not shown) or a pipe rack (also not shown) so that the piping system component connection ends 75, 77 are in axial and circumferential alignment with their terminal edges butted against each other to form an interface.

The heat and vacuum applying clamp 310 is then secured about the terminal portions of the piping system component connection ends 75, 77.

When the heat and vacuum applying clamp 310 is secured about the piping system component connection ends 75, 77, the semi-annular channels 321, 335 and the melt region of the piping system component connection ends form a vacuum chamber. It is important that a good seal be provided by the edges of the semi-circular openings 319, 333 so as to allow for creation of a vacuum in the vacuum chamber.

Hot air is forced into the inlet 343. Such hot air circulates about, heating the melt region, and exits via the outlet 329. When the melt region has melted sufficiently, the flow of hot air into the inlet 335 is terminated, the inward flow of air into outlet 329 is prevented, and a vacuum is applied to the inlet 343 for a few seconds. The application of vacuum causes the melted and expanded thermo-plastic material to be drawn into the rounded annular channel formed by the rounded semi-annular channels 321, 335. The outlet 329 is then controlled to allow the outward flow of air and cool air is forced into the inlet 343 to cool the melted thermo-plastic material. The heated thermo-plastic material is cooled so that it congeals to form a solid fused joint. The heat and vacuum applying clamp 310 may be removed after the heated thermoplastic material has cooled to a temperature below its material softening point.

It should be noted that fluids other that air may be utilized for providing heating and/or cooling. For example, heated silicone or glycerine may be utilized to provide heating.

It should be understood that the specific heating and/or vacuum applying structures disclosed herein are examples of implementing the concepts of the invention and should not be regarded as limiting. For example, the heating and vacuum applying clamp 210 of FIG. 10 may be utilized with supporting gaskets in a manner similar to the heat and vacuum applying clamp 50 of FIG. 1. Similarly, the heat and vacuum applying clamp 50 of FIG. 1 is readily modified for use with the mating sleeve 220 of FIG. 8 in a manner similar to the use of the heating and vacuum applying clamp 210 of FIG. 10. With such modification, the supporting gaskets 67, 69 would not be utilized, and the inside surface of the bore 53 would include an annular channel for accommodating the longitudinally arced central portion of the sleeve 220.

It should also be understood that various structures may be utilized to provide vacuum to the vacuum chamber surrounding the melt region of the piping system component connection ends being joined. Thus, as disclosed, one type of appropriate structure includes the use of a vacuum header and a plurality of holes or bores coupling the vacuum header to the vacuum chamber. Also disclosed are radially extensive partially annular slots which are communicatively interposed between the vacuum chamber and vacuum headers. Still further disclosed is a radially extensive slot coupled to and surrounding the vacuum chamber. A plurality of radially extensive slots with appropriate vacuum inlets and/or vacuum distribution headers could also be used.

In the above-disclosed clamp structures, locking apparatus (including elongated levers) is included to secure the clamp in a closed position for the application of heat and vacuum. However, it should be noted that for the clamp of FIGS. 4, 5 and 6, which only applies vacuum, the application of vacuum could be utilized to maintain the clamp closed during the application of the vacuum. This would require precise machining of the semi-annular halves of the clamp as well as a precise fit around the piping system component connection ends to be joined.

In terms of preparing the piping system component connection ends for fusion joining pursuant to the invention, it is important that the interfacing terminal edges be cut square. Further, it has been found that reducing the thermo-plastic material at the interface may provide for a better fused joint. For example, it may be helpful to bevel the outside of the interfacing terminal edges, so that the melt region includes a V-shaped groove. It may also be helpful to slightly bevel the inside of the interfacing terminal edges. Deburring the inside of the terminal edges may suffice.

The foregoing described invention provides many advantages including the following. The inward expansion and flow of the melted thermo-plastic material due to thermal expansion and gravity is counteracted by vacuum so that internal beads or crevices are avoided in the resulting fused joint. At worst, a very shallow, inconsequential "knit line" may be formed. Further, since the invention does not utilize any apparatus internal to the piping system component connection ends to be joined, the possibility of contamination resulting from the joining process is substantially reduced.

A further important advantage is that the invention can be utilized to provide fusion joints for thermoplastic materials that are readily oxidized, thereby being rendered unusable, when subjected to known heat fusion techniques. Such readily oxidized thermo-plastic materials include polyvinyl chloride (PVC), polyethylene (PE), polypropylene (PP), polybutylene (PB), ABS (previously mentioned), and chlorinated polyvinyl chloride (CPVC). The invention prevents destructive oxidation by the application of a vacuum which substantially removes the air that is necessary for oxidation.

The disclosed invention is also readily utilized in on-site joining of thermo-plastic piping system components.

Although the foregoing has been a description and illustration of specific embodiments of the invention, various modifications and changes thereto can be made by persons skilled in the art without departing from the scope and spirit of the invention as defined by the following claims.

What is claimed is:

1. An apparatus for fusion joining first and second axially abutted piping system component connection ends that are in axial and circumferential alignment, comprising:
   enablement means for enabling the heating of a melt region in the proximity of the interface of the first and second piping system component connection ends at least to the material softening point of the thermo-plastic material of the melt region; and
   vacuummetric means for vacuummetrically inducing outward translation of the melted material of the melt region.

2. The fusion joining apparatus of claim 1 wherein said heating enabling means includes means for thermally transferring applied thermal energy to said melt region.

3. The fusion joining apparatus of claim 2 wherein said means for thermally transferring applied thermal energy includes fluid channelling means for fluidic communication with the melt region, and wherein the applied thermal energy comprises a material softening hot fluid forced in said fluid channelling means.

4. The fusion joining apparatus of claim 2 wherein said means for thermally transferring applied thermal energy conductively receives the applied thermal energy.

5. The fusion joining apparatus of claim 4 further including a source of thermal energy that is thermally integral with said means for thermally transferring applied thermal energy.

6. The fusion joining apparatus of claim 4 wherein said means for thermally transferring applied thermal energy provides radiant heat to the melt region of the first and second piping system component connection ends.

7. The fusion joining apparatus of claim 1 wherein said heating enablement means comprises direct contact heating means for heating the melt region by direct contact with the melt region, and wherein said vacuummetric means is selectively positionable over the melt region after the melt region is melted.

8. The fusion joining apparatus of claim 7 wherein said vacuummetric means circumferentially encompasses the axially abutted piping system component connection ends and is transversely sectioned for longitudinal separability to allow for placement of said direct contact heating means against the melt region.

9. The fusion joining apparatus of claim 1 wherein said vacuummetric means includes chamber defining means for circumferentially encompassing the axially abutted piping system component connection ends and cooperating with the outer surface of the melt region to form a vacuum chamber that surrounds the melt region.

10. The fusion joining apparatus of claim 9 wherein said chamber defining means includes a cylindrical mating sleeve for circumferentially fitting around the axially abutted piping system component connection ends, said cylindrical mating sleeve including a longitudinally arced portion for defining a vacuum chamber adjacent the melt region of the axially abutted piping system component connection ends.

11. The fusion joining apparatus of claim 10
said longitudinally arced portion communicates applied material softening heat to the melt region of the axially abutted piping system component connection ends.

12. The fusion joining apparatus of claim 9 wherein said vacuum chamber is in fluidic communication with means for distributing vacuum about said vacuum chamber.

13. The fusion joining apparatus of claim 13 wherein said vacuum distributing means includes a continuous slot emanating from an interior wall of said vacuum chamber.

14. The fusion joining apparatus of claim 12 where said vacuum distributing means includes a plurality of holes respectively emanating from an interior wall of said vacuum chamber.

15. The fusion joining apparatus of claim 14 wherein said vacuum distributing means further includes a vacuum distributing header communicatively interposed between said channels and a vacuum inlet.

16. The fusion joining apparatus of claim 1 wherein said overall apparatus is configured in traversely separable first and second sections respectively having semicircular openings.

* * * * *